United States Patent
Gerl

(10) Patent No.: US 9,907,434 B2
(45) Date of Patent: Mar. 6, 2018

(54) CONTROL ELEMENT FOR A HOUSEHOLD APPLIANCE

(71) Applicant: BSH Bosch und Siemens Hausgeräte GmbH, Munich (DE)

(72) Inventor: Markus Gerl, Palling (DE)

(73) Assignee: BSH Hausgeräte GmbH, Munich (DE)

( * ) Notice: Subject to any disclaimer, the term of this patent is extended or adjusted under 35 U.S.C. 154(b) by 208 days.

(21) Appl. No.: 14/439,699

(22) PCT Filed: Oct. 24, 2013

(86) PCT No.: PCT/EP2013/072271
§ 371 (c)(1),
(2) Date: Apr. 30, 2015

(87) PCT Pub. No.: WO2014/075886
PCT Pub. Date: May 22, 2014

(65) Prior Publication Data
US 2015/0282666 A1    Oct. 8, 2015

(30) Foreign Application Priority Data
Nov. 13, 2012  (DE) .......................... 10 2012 220 615

(51) Int. Cl.
*A47J 36/00* (2006.01)
*G05B 15/02* (2006.01)
(Continued)

(52) U.S. Cl.
CPC .............. *A47J 36/00* (2013.01); *F24C 7/082* (2013.01); *G05B 15/02* (2013.01); *G08C 17/02* (2013.01);
(Continued)

(58) Field of Classification Search
None
See application file for complete search history.

(56) References Cited

U.S. PATENT DOCUMENTS 5,276,454 A  *  1/1994  Gonzalez ................. H01Q 1/22
                                                    343/702
5,426,440 A  *  6/1995  Shimada ................ H01Q 1/088
                                                    343/702
(Continued)

FOREIGN PATENT DOCUMENTS

DE         19903223 A1    8/2000
DE      102005028095 A1    1/2007
(Continued)

OTHER PUBLICATIONS

'LG Thing linqs your smart appliances with WiFi and smartphone apps' by Thomas Ricker, Engadget, Jan. 4, 2011.*
(Continued)

*Primary Examiner* — Steven Snyder
(74) *Attorney, Agent, or Firm* — Michael E. Tschupp; Andre Pallapies; Brandon G. Braun

(57) ABSTRACT

A control element for a household appliance includes an antenna for communicating with an external data source. The antenna can be formed by a cap which is connected to a housing of the control element and is retractable in relation to the housing by a retraction mechanism accommodated in the housing. A transmit/receive unit is supported by the cap and is connected to flexible conductor paths for conveying received or transmitted data.

21 Claims, 2 Drawing Sheets

(51) Int. Cl.
*H01Q 1/44* (2006.01)
*F24C 7/08* (2006.01)
*G08C 17/02* (2006.01)
*G08C 23/04* (2006.01)
*H01H 3/08* (2006.01)

(52) U.S. Cl.
CPC ............. *G08C 23/04* (2013.01); *H01H 3/08* (2013.01); *H01Q 1/44* (2013.01); *H01H 2003/085* (2013.01)

(56) References Cited

U.S. PATENT DOCUMENTS

| | | | | |
|---|---|---|---|---|
| 5,572,224 | A * | 11/1996 | Moller | H01Q 1/242 343/702 |
| 5,684,672 | A * | 11/1997 | Karidis | G06F 1/1616 343/702 |
| 5,903,832 | A * | 5/1999 | Seppanen | H04W 48/18 455/435.3 |
| 6,317,781 | B1 * | 11/2001 | De Boor | H04M 1/274558 707/999.01 |
| 6,362,793 | B1 * | 3/2002 | Sawamura | H01Q 1/243 343/702 |
| 6,366,247 | B1 * | 4/2002 | Sawamura | H01Q 1/244 343/702 |
| 6,410,871 | B1 * | 6/2002 | Rarbach | G05G 1/087 200/336 |
| 6,441,789 | B1 * | 8/2002 | Sasano | H01Q 1/244 343/702 |
| 6,507,762 | B1 * | 1/2003 | Amro | G08C 19/28 700/83 |
| 6,546,263 | B1 * | 4/2003 | Petty | H04M 1/72519 345/158 |
| 6,691,233 | B1 * | 2/2004 | Gannage | G06F 1/1632 713/300 |
| 7,171,728 | B2 * | 2/2007 | Chirumbolo | H01H 3/08 16/429 |
| 7,589,726 | B2 * | 9/2009 | Aholainen | H04L 41/12 345/440 |
| 7,943,878 | B2 * | 5/2011 | Hamm | G05G 1/105 200/316 |
| 8,630,741 | B1 * | 1/2014 | Matsuoka | H04L 12/2829 700/12 |
| 9,065,170 | B2 * | 6/2015 | Lee | H01Q 1/088 |
| 9,160,392 | B2 * | 10/2015 | Bartholomew | H04B 1/3833 |
| 9,391,357 | B2 * | 7/2016 | Ishida | H01Q 1/44 |
| 9,673,511 | B2 * | 6/2017 | Lee | H01Q 5/307 |
| 2001/0008237 | A1 | 7/2001 | Essig | |
| 2002/0004373 | A1 * | 1/2002 | Hutter | H01Q 1/1257 455/575.7 |
| 2002/0094778 | A1 * | 7/2002 | Cannon | H04W 88/02 455/41.3 |
| 2004/0262284 | A1 * | 12/2004 | Gramlich | F24C 7/087 219/390 |
| 2005/0039305 | A1 * | 2/2005 | Chirumbolo | H01H 3/08 16/441 |
| 2007/0188290 | A1 | 8/2007 | Nakasuji et al. | |
| 2010/0181175 | A1 * | 7/2010 | Hamm | G05G 1/105 200/310 |
| 2011/0153871 | A1 | 6/2011 | Ferragut, II et al. | |
| 2012/0329524 | A1 * | 12/2012 | Kent | G06F 3/044 455/566 |
| 2013/0106662 | A1 * | 5/2013 | Ishida | H01Q 1/44 343/702 |
| 2013/0207855 | A1 * | 8/2013 | Chien | H01Q 21/30 343/721 |
| 2013/0270094 | A1 * | 10/2013 | Hamm | F24C 7/082 200/566 |
| 2015/0207206 | A1 * | 7/2015 | Bartholomew | H04B 1/3833 455/90.2 |
| 2015/0330704 | A1 * | 11/2015 | Kaymak | F25D 29/005 62/131 |
| 2016/0051078 | A1 * | 2/2016 | Jenkins | A47J 27/62 99/331 |
| 2016/0087328 | A1 * | 3/2016 | Lee | H01Q 5/307 343/702 |
| 2016/0149290 | A1 * | 5/2016 | Park | H01Q 1/243 343/702 |
| 2016/0179340 | A1 * | 6/2016 | Ogawa | G08C 17/02 715/736 |
| 2016/0322695 | A1 * | 11/2016 | Claeys | H01Q 1/125 |
| 2016/0327281 | A1 * | 11/2016 | Bhogal | F24C 7/086 |
| 2016/0378131 | A1 * | 12/2016 | Battlogg | G05G 5/03 74/553 |

FOREIGN PATENT DOCUMENTS

| | | | | |
|---|---|---|---|---|
| DE | 102008027471 A1 * | 12/2009 | | F24C 3/124 |
| DE | 102010039560 A1 | 2/2012 | | |
| DE | 10201062578 A1 | 6/2012 | | |
| EP | 1962167 A1 * | 8/2008 | | F24C 7/082 |
| EP | 2363647 A1 | 9/2011 | | |
| EP | 2420735 A1 | 2/2012 | | |
| GB | 2422692 A | 8/2006 | | |
| WO | 2008003572 A2 | 1/2008 | | |
| WO | 2012118455 A2 | 9/2012 | | |

OTHER PUBLICATIONS

'GE Self-Cleaning Gas Ranges Owners Manual' Jul. 2015.*
'GE Electric Free-Standing Ranges Owners Manual' Aug. 2016.*
International Search Report PCT/EP2013/072271 dated Feb. 23, 2015.

* cited by examiner

CONTROL ELEMENT FOR A HOUSEHOLD APPLIANCE

BACKGROUND OF THE INVENTION

The following invention relates to a control element for a domestic appliance, in particular for a cooking appliance. The invention further relates to a domestic appliance for accommodating such a control element.

Control elements are known from the prior art, for instance EP1962167A1, which are suited to adjusting the values and parameters of domestic appliances. These include inter alia knobs on the cooking appliance for adjusting the temperature or mode of operation or knobs on the hob for adjusting the gas level.

In addition, a series of applications for external data sources, for instance radio clocks, online databases, maintenance services etc. for domestic appliances, which require a data communication system, are known from the prior art. As an alternative to the possibility of achieving such external applications by way of a wired data communication solution, the wireless variant in domestic appliances is particularly suited hereto, since these are in most instances arranged decentrally, variably and inaccessibly within the housing.

Previous wireless solutions fail due to the poor receive quality of such a data communication system, since the domestic appliance, on account of its installation position between other objects and its metallic housing, is well shielded against good reception.

BRIEF SUMMARY OF THE INVENTION

The object of the present invention is therefore to improve the wireless receive and transmit properties of the domestic appliance to external data sources.

In accordance with the invention, the object is in each instance achieved by the totality of the features of the independent claims. Further advantageous embodiments of the invention are described in the subclaims.

In accordance with the invention, the control element for a domestic appliance, in particular for a cooking appliance, is preferably embodied as a dial for adjusting the values and/or parameters of the domestic appliance, with an antenna for communication with an external data source. Since the control elements normally face into the room, e.g. into the kitchen, the antenna accordingly also faces the center of the room. On account of the structural embodiment such that the control element has an antenna, an improved receive/transmit property of the domestic appliance is achieved, since it is assumed that a better receive supply prevails in the center of the room than in the edge area of the room. In this way the control element is embodied as a dial for adjusting values and/or parameters of the domestic appliance. The domestic appliance preferably comprises at least one transmit system and/or receive system. This communication system assists the domestic appliance with wireless coupling to a data communication system, e.g. the WLAN and thus Internet access.

The cap of the control element is preferably embodied as an antenna. In this way the cap of the control element, which is preferably produced from a radio conductive material, is used as the antenna of the transmit system and/or receive system. On account of this arrangement, the antenna of the communication system is located upstream of the shielding components of the appliance front and achieves improved receipt.

The control element or at least the cap is preferably embodied to be wholly or partially retractable. On account of this function, the cap of the control element with the integrated antenna of the transmit and/or receive system of a communication unit is extended when the domestic appliance is in use and is thus in front of the appliance front of the domestic appliance, which results in an improved receipt and transmit power. In the retracted state of the control element, the cap and thus the antenna in front of the cooking appliance disappear, which results in an attractive design of the domestic appliance. The control element can thus be moved in the direction of the axis of rotation axially between an operating position and a rest position. This retractable actuation of the control element is preferably also provided in order to activate or deactivate the communication system and/or the transmit and receive unit. When the control element is retracted, the communication system is thus in an off or standby mode and when the control element is extended, the communication system is in the transmit and receive mode.

According to one variant, the control element comprises flexible conductor paths. These flexible conductor paths enable signal transmission past the retraction mechanism from the cap to the communication system. This is particularly important since the retraction mechanism has to be flexibly embodied in the extending direction and in the direction of rotation for value adjustment purposes.

According to one variant, the control element comprises injected conductor paths. In this variant, the individual parts of the retraction mechanism transmit the signal from the cap to the communication system and in the counter direction by means of injected conductor paths.

The control element preferably comprises an electrical circuit board with conductor paths for contacting purposes. The contacting of the flexible or injected conductor paths with the appliance electronics, in particular to the communication system is realized by means of a plug-in connection to the switch bracket. In order to enable the necessary electronic connection when rotating the handle, a printed circuit board with conductor paths and contacting sliding contacts is used.

The control element preferably comprises a display element. The display element shows in particular the receipt, the dispatch or the receive quality. The display element is particularly useful in order to inform the user of the domestic appliance of the status of the communication system and the transmit and receive properties of the domestic appliance.

The invention also achieves the object with a domestic appliance, in particular a cooking appliance comprising a preceding control element. The transmit/receive properties of the communication system of the domestic appliance are particularly good if at least one component, in particular the antenna preferably integrated in the cap, is arranged at least in an operating position in front of the appliance front.

BRIEF DESCRIPTION OF THE DRAWINGS

Further advantages and details of the invention are explained in more detail with the aid of the exemplary embodiments shown in the schematic figures, in which.

DETAILED DESCRIPTION OF EXEMPLARY EMBODIMENTS OF THE PRESENT INVENTION

Figure 1:
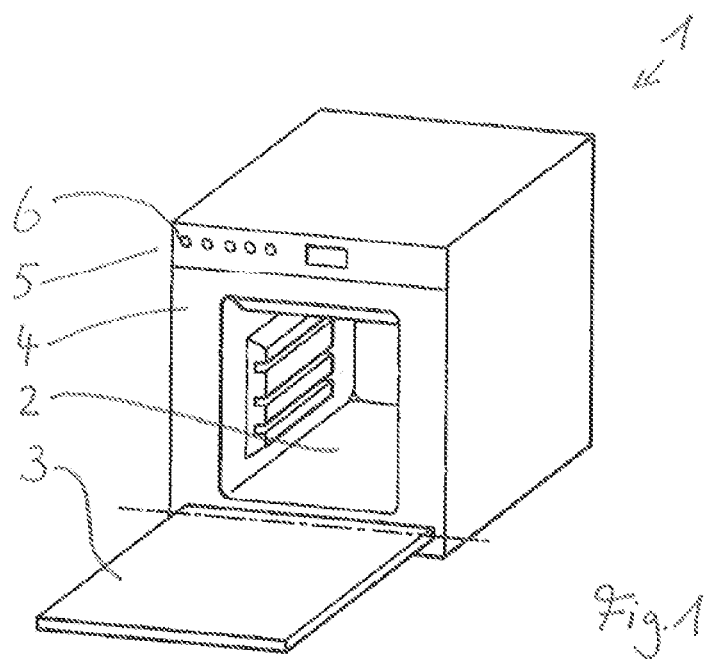
FIG. 1 shows a schematic perspective representation of an exemplary embodiment of an inventive domestic appliance having an exemplary embodiment of an inventive control element.

Similar or functionally similar elements are provided with the same reference characters in the figures.

The following figures indicate the inventive control element for a domestic appliance in the example of a cooking appliance. The invention is however not restricted to use in a cooking appliance, but can be used instead in all types of domestic appliance, such as for instance hobs, washing machines, dishwashers, tumble dryers, refrigeration devices etc.

FIG. 1 shows a perspective representation of a cooking appliance 1 for preparing food, which, in the exemplary embodiment, is an oven. The cooking appliance 1 includes a cooking compartment 2 for preparing food. This cooking compartment 2 is sealed by a door 3 which fastens in a hinged manner. In this way the door 3 forms a significant part on the appliance front 4, which forms the visible surface of the cooking appliance which faces the user. The appliance front 4 also has a control section 5, which assists the user in inputting system parameters, like for instance heating type or heating temperature. These inputs are generally effected by way of control elements 6, such as e.g. knobs, rotary knobs, push buttons, multiway buttons, touch controls. The control section comprises, in addition to control elements 6, also output elements, such as a display.

Figure 2:
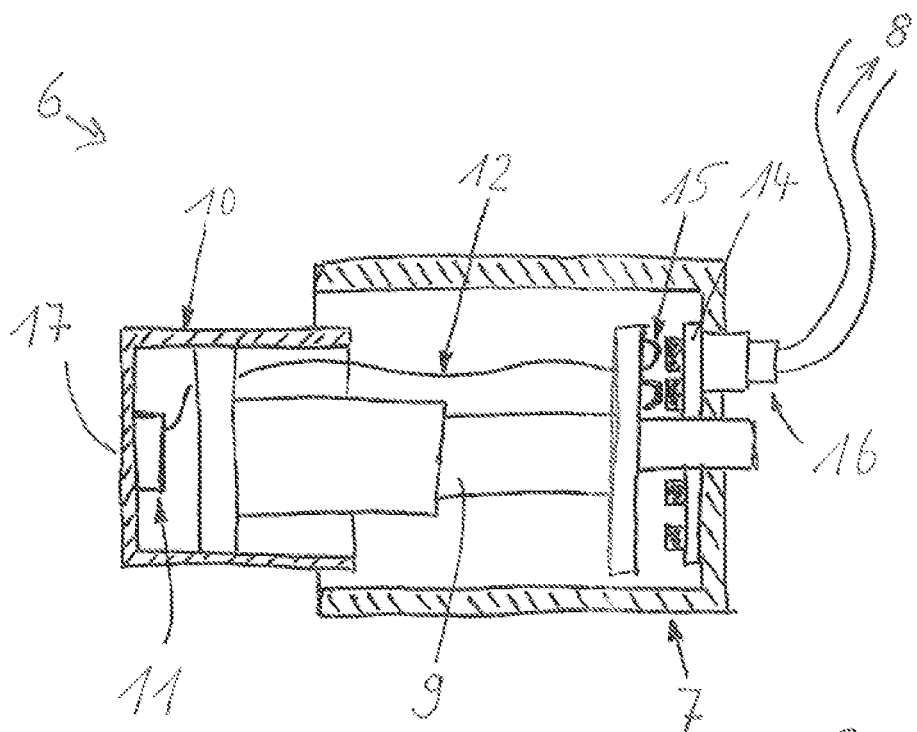
FIG. 2 shows a schematic representation of a control element according to a first exemplary embodiment.

FIG. 2 shows a schematic representation of a control element 6 in its cut-out side view. The control element 6 of a domestic appliance shown by way of example here as a retractable rotary knob is used to adjust the system parameters. To this end, the control element 6 is sunk into the control section 5 and forms a uniform, preferably level appliance front 4 with the other system components. To this end the housing, also referred to as a switch handle bracket, is attached in a flush manner with the appliance front 4. The housing 7 has a retraction mechanism 9, which mounts a cap 10 in a rotatable and retractable manner. The cap 10 assists the user as a grippable input element, which actuates the same by means of pressing and rotation for value adjustment purposes. The cap 10 is mounted using the retraction mechanism 9, such that it is arranged in a first position so far in front of the appliance front that it can be easily gripped and rotated by the user. If the control element 6 is not required, e.g. when the cooking appliance is switched off, in standby mode or if the control element is not to be accessible for children, the cap 10 is received in its second position by the retraction mechanism 9 in the housing 7 such that the front of the cap 10 is flush with the appliance front 4. In order to provide a wireless communication system with improved receive properties to the domestic appliance, the control element 6 comprises at least one component of a communication system 8. The communication system 8 consists of hard and software components, which are arranged in the cooking appliance 1 and are preferably wired, but are also alternatively connected in a wireless manner to the control element 6. In accordance with the invention, the cap 10 of the control element 6 comprises a transmitter/receiver 11 of the communication system 8, which is suited to receiving or sending data transmission forms, such as e.g. WLAN, Bluetooth, Infrared or similarly known systems. In the exemplary embodiment shown, the transmit/receive unit 11 is arranged centrally below the cap 10 when viewed from the front, wherein the connection is improved if the cap has a recess and/or is manufactured from a material which allows the beams to pass through the cap to the transmit/receive unit. Alternatively, the transmit/receive unit 11 is attached on the front face of the cap or on the lateral surface of the cap or as a wall around the cap. A further alternative provides to embody the cap itself from a conductive material so that the cap or its coating is used as an antenna. According to the exemplary embodiment from FIG. 2, the received or transmitted data is conveyed by way of flexible conductor paths 12 to the communication system 8. In order to bridge the housing side fastened rigidly to the cooking appliance and the elements of the control elements 6 mounted in a rotatable manner, a printed circuit board with conductor paths 14 is located on the surface of the housing wall, which is supplied with electrical power by sliding contacts 15 mounted in a rotatable manner. For simple assembly of the communication system 8 located in the cooking appliance 1 using the antenna function of the control element 6, a plug element 16 is located on the rear housing side 7. To provide the user of the cooking appliance 1 with feedback relating to the function of the communication system 8, in particular relating to the quality and/or quantity of the data communication and transmit properties, a display element 17 is provided on the control element 6, in particular on the cap 10 or directly adjacent thereto. This display element can be embodied both as at least an LED display element, as a multi-colored display element, as a seven segment display or as a full text display in the manner of a monitor. This display element 17 can be arranged both on the end face of the cap 10 of the control element 6 and also in a peripheral or punctiform fashion on the lateral surface of the cap 10. Alternatively, this display element is attached directly adjacent to the control element 6, in particular on the display apparatus of the control section 5.

Figure 3:
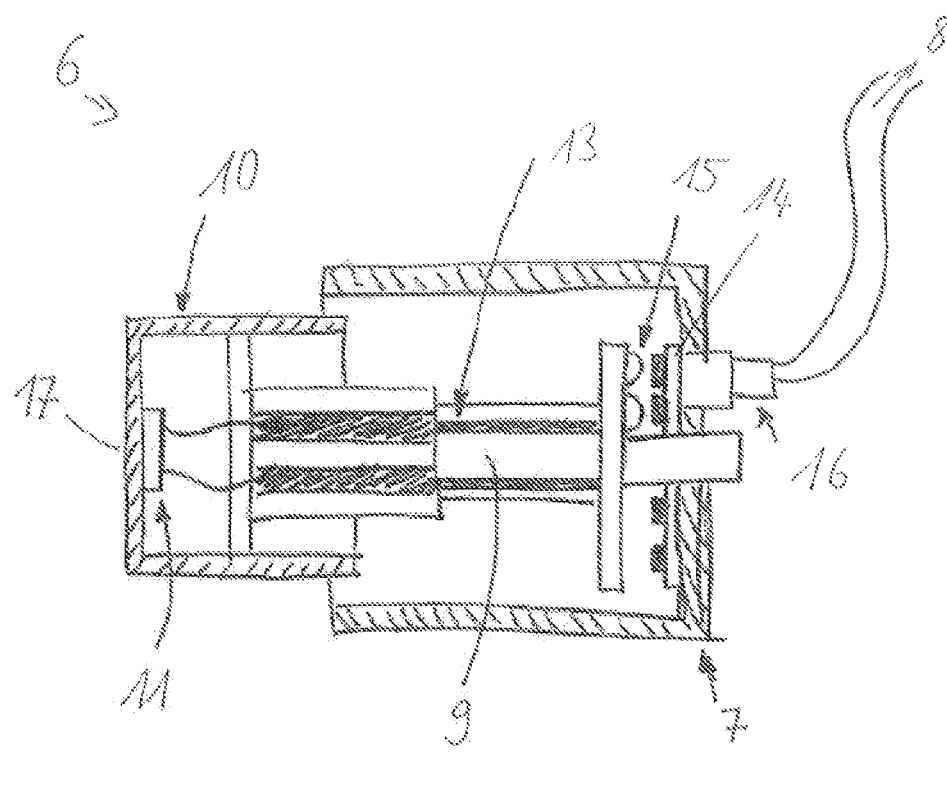
FIG. 3 shows a schematic representation of a control element according to a second exemplary embodiment.

FIG. 3 shows a schematic representation of the control element in a second embodiment. In this way data is transmitted between the communication system 8 and the transmit/receive unit 11 by way of conductor paths 13 injected into the retraction mechanism 9. This allows for secure contacting both in the extended state of the control element 6 and in the retracted state since flexible parts can be dispensed with.

Figure 4:
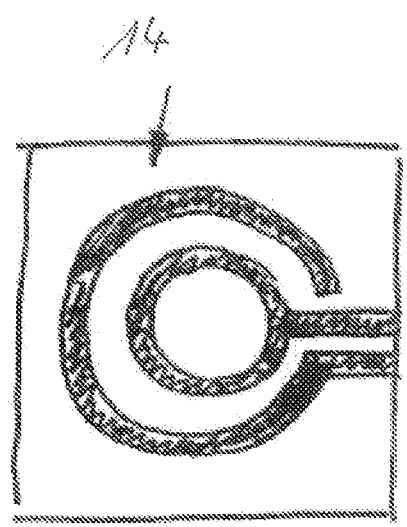
FIG. 4 shows a schematic representation of a circuit board with conductor paths.

FIG. 4 shows a schematic representation of a printed circuit board having conductor paths of an inventive control element 6. This printed circuit board 14 is disposed on the rear housing wall 7 for contact with the movement acting in a rotary fashion on the retraction mechanism 9 by means of the rotary movement of the user, in order to ensure its electrical contact between the transmit and receive system 11 with the communication system 8. The two electrical phases required here are supplied by way of two separate wires from the transmit and receive unit 11 by way of conductor paths to the sliding contacts 15, which permanently contacts the printed circuit board with its conductor paths. To this end, a conductor path image shown in FIG. 4 consisting of a first conductor path in the form of a circle with a rib and a second conductor path which concentrically encloses the circle are advantageous.

The subject matter of the invention is naturally also a cooking appliance having a control element which is described at the start.

Further features of the invention will emerge from the claims, figures and description of the figures. The features and feature combinations mentioned above in the description and the features and feature combinations mentioned below in the description of the figures and/or simply shown in the figures can be used not only in the combination specified in each instance but also in other combinations or alone without departing from the scope of the invention. Embodiments of the invention that are not illustrated and described specifically in the figures but emerge and can be generated as a result of separate feature combinations from the described embodiments should therefore also be considered to be comprehensive and disclosed.

In the context of a data communication facility, the term receive and receive strength is also always understood to mean the transmission and its transmission strength.

Irrespective of the exemplary embodiment shown, it is also the subject matter of the invention to embody the transmit/receive unit 11 in an element, which is not intended for value adjustment purposes, but can only be clicked on and off in the manner of a ballpoint pen.

LIST OF REFERENCE CHARACTERS

1 Cooking appliance
2 Cooking compartment
3 Door
4 Appliance front
5 Control section
6 Control element
7 Housing
8 Communication system
9 Retraction mechanism
10 Cap
11 Transmitter/receiver
12 Flexible conductor path
13 Injected conductor path
14 Printed circuit board with conductor paths
15 Sliding contacts
16 Plug element
17 Display element

The invention claimed is:

1. A control element for a domestic appliance, wherein the control element comprises:
   a housing, the housing defining an interior cavity with a housing wall;
   a plurality of conductor paths disposed on a surface of the housing wall;
   a retraction mechanism with sliding contacts, the retraction mechanism coupled to the housing in a manner that allows rotation of the retraction mechanism and an electronic connection between the sliding contacts and the plurality of conductor paths; and
   a physical cap attached to the retraction mechanism, the physical cap functioning as an antenna for communication with an external data source.

2. The control element of claim 1, configured for controlling a cooking appliance.

3. The control element of claim 1, constructed in the form of a dial for adjusting values and/or parameters of the domestic appliance.

4. The control element of claim 1, further comprising the retraction mechanism being configured to retract the physical cap so that the physical cap is flush with the housing.

5. The control element of claim 1, further comprising a transmit/receive unit supported by the physical cap and conductor paths injected into the retraction mechanism, the injected conductor paths connected to the transmit/receive unit and conveying received or transmitted data through the sliding contacts to the plurality of conductor paths.

6. The control element of claim 1, further comprising a display element configured to indicate at least a receipt, dispatch or receive quality.

7. A domestic appliance, comprising:
   a communication system; and
   at least one control element operably connected to the communication system and comprising:
   a housing defining an interior cavity with a housing wall,
   a plurality of conductor paths disposed on a surface of the housing wall,
   a retraction mechanism with sliding contacts coupled to the housing in a manner that allows rotation of the retraction mechanism and an electronic connection between the sliding contacts and the plurality of conductor paths, and
   a physical cap attached to the retraction mechanism, the physical cap functioning as an antenna for communication with an external data source.

8. The domestic appliance of claim 7, constructed in the form of a cooking appliance.

9. The domestic appliance of claim 7, wherein the control element is constructed in the form of a dial for adjusting values and/or parameters of the domestic appliance.

10. The domestic appliance of claim 7, wherein the control element comprises the retraction mechanism being configured to retract the physical cap so that the physical cap is flush with the housing.

11. The domestic appliance of claim 7, wherein the control element comprises a transmit/receive unit supported by the physical cap and flexible conductor paths connected to the transmit/receive unit, the flexible conductor paths conveying received or transmitted data through the sliding contacts to the plurality of conductor paths.

12. The domestic appliance of claim 7, wherein the control element comprises a transmit/receive unit supported by the physical cap and conductor paths injected into the retraction mechanism, the conductor paths connected to the transmit/receive unit and conveying received or transmitted data through the sliding contacts to the plurality of conductor paths.

13. The domestic appliance of claim 7, further comprising the plurality of conductor paths being disposed on an electrical printed circuit board supported by the housing.

14. The domestic appliance of claim 7, wherein the control element comprises a display element configured to indicate at least a receipt, dispatch or receive quality.

15. The domestic appliance of claim 7, further comprising an appliance front, said control element being arranged on the appliance front such that at least one component of the communication system is arranged at least in an operating position in front of the appliance front.

16. A control element for a domestic appliance, wherein the control element comprises:
   a housing, the housing having a plurality of conductor paths disposed on a surface of the housing wall,
   a rotatable retraction mechanism with sliding contacts, the retraction mechanism coupled to the housing and allowing an electronic connection between the sliding contacts and the plurality of conductor paths, and
   a physical cap attached to the rotatable retraction mechanism, the physical cap functioning as an antenna for communication with an external data source.

17. The control element of claim 16, constructed in the form of a dial for adjusting values and/or parameters of the domestic appliance.

18. The control element of claim 16, further comprising the retraction mechanism being configured to retract the physical cap so that the physical cap is flush with the housing.

19. The control element of claim 16, wherein the physical cap is constructed from a radio conductive material.

20. The control element of claim 1, further comprising a transmit/receive unit supported by the physical cap, flexible conductor paths connected to the transmit/receive unit and conveying received or transmitted data through the sliding contacts to the plurality of conductor paths.

21. The control element of claim 1, further comprising a communication system connected to the housing.

* * * * *